(12) United States Patent
Engel (10) Patent No.: US 9,080,845 B2
(45) Date of Patent: Jul. 14, 2015

(54) METHOD AND DEVICE FOR DETECTING THE COUPLING OF PARTS TO A MACHINE

(71) Applicant: CARL ZEISS INDUSTRIELLE MESSTECHNIK GMBH, Oberkochen (DE)

(72) Inventor: Thomas Engel, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 228 days.

(21) Appl. No.: 13/746,758

(22) Filed: Jan. 22, 2013

(65) Prior Publication Data

US 2013/0127450 A1 May 23, 2013

Related U.S. Application Data

(63) Continuation of application No. PCT/EP2011/061972, filed on Jul. 13, 2011.

(30) Foreign Application Priority Data

Jul. 22, 2010 (DE) .......................... 10 2010 031 976

(51) Int. Cl.
*G01B 7/30* (2006.01)
*G01B 7/008* (2006.01)
*B23Q 17/00* (2006.01)
*G01B 5/012* (2006.01)
*G01B 21/04* (2006.01)

(52) U.S. Cl.
CPC .............. *G01B 7/008* (2013.01); *B23Q 17/002* (2013.01); *G01B 5/012* (2013.01); *G01B 21/047* (2013.01)

(58) Field of Classification Search
USPC ........................................ 324/207.2–207.26
See application file for complete search history.

(56) References Cited

U.S. PATENT DOCUMENTS

| 4,340,133 A | 7/1982 | Blersch |
| 5,918,378 A | 7/1999 | McMurtry et al. |
| 7,534,187 B2 | 5/2009 | Donofrio et al. |

(Continued)

FOREIGN PATENT DOCUMENTS

| DE | 20 2004 011 364 U1 | 9/2004 |
| DE | 10 2006 041 812 A1 | 3/2008 |

(Continued)

OTHER PUBLICATIONS

"Application Note AMR Free Pitch Sensoren für Winkel- and Längenmessung AA700 Familie", Apr. 2009, pp. 1-33 Sensitec.

*Primary Examiner* — Jay Patidar
(74) *Attorney, Agent, or Firm* — Laurence A. Greenberg; Werner H. Stemer; Ralph E. Locher (57) ABSTRACT

A coupled state versus a decoupled state of a part relative to a machine, in particular of a coordinate measuring device or a machine tool, is determined. The part to be coupled can be moved toward a contact region of the machine in an axial direction in order to establish the coupled state, and can be moved away from the contact region in the axial direction in order to establish the decoupled state. A magnetoresistive sensor is used to generate a sensor signal that depends on an axial position of the part and a further sensor signal that depends on a rotational position of the part relative to the machine. The sensor signals are evaluated and the result is used to determine whether the part is coupled to the contact region of the machine and/or whether the part is decoupled from the contact region.

8 Claims, 9 Drawing Sheets

(56) References Cited

U.S. PATENT DOCUMENTS

2005/0207857 A1    9/2005  Jordil et al.
2006/0016276 A1    1/2006  Mies
2007/0241742 A1*  10/2007  Arakawa et al. ......... 324/207.25

FOREIGN PATENT DOCUMENTS

| DE | 10 2007 022 326 A1 | 11/2008 |
| GB | 2 050 552 A | 1/1981 |
| WO | 87/01798 A1 | 3/1987 |

* cited by examiner

METHOD AND DEVICE FOR DETECTING THE COUPLING OF PARTS TO A MACHINE

CROSS-REFERENCE TO RELATED APPLICATION

This application is a continuation, under 35 U.S.C. §120, of copending international application No. PCT/EP2011/061972, filed Jul. 13, 2011, which designated the United States; this application also claims the priority, under 35 U.S.C. §119, of German patent application No. DE 10 2010 031 976.7, filed Jul. 22, 2010; the prior applications are herewith incorporated by reference in their entirety.

BACKGROUND OF THE INVENTION

Field of the Invention

The invention relates to a method for determining a coupled state and/or a decoupled state of a part, which can be coupled, of a machine. The invention also relates to a configuration for determining a coupled state and/or a decoupled state of a part, which can be coupled, of a machine. The machine is, in particular, a coordinate measuring device or a machine tool.

Parts, for example sensing devices for making mechanical contact with an object which is to be measured, sensors (for example optical sensors for contact-free sampling of an object which is to be measured, or sensors which are generated for generating sensor signals when mechanical contact is made with an object, for example by means of a sensing device which, in turn, is coupled to the sensor) and mechanical components, for example joints (for example so-called rotary/pivot joints which have two axes of rotation), are often coupled in coordinate measuring devices. The invention relates, in particular, to couplings in which the parts which are to be coupled to one another can be moved relative to one another in predefined relative positions. For example, a sensing device of a coordinate measuring device has to be coupled to the coordinate measuring device very accurately in a predefined manner in order to ensure the measurement accuracy. Otherwise, the sensing device would have to be recalibrated every time it was coupled to the coordinate measuring device. Ensuring such predefined relative positions which can be established in a reproducible manner by corresponding shaping of the mechanical interfaces of the parts which are to be coupled is known from coordinate measuring technology. In particular, spherical, cylindrical and tooth-like projections and cutouts at the mechanical interfaces are known. By way of example, the parts which are to be coupled to one another are coupled to one another by a movement in the axial direction in the case of a so-called three-point bearing, with in each case a pair of cylinders or a pair of balls being arranged on one part at three points which are generally distributed around the center axis of the axial direction, and with a corresponding projection, for example a cylindrical projection or a spherical projection, being arranged on the other part such that it is arranged between the pair of cylinders or pair of balls of the other part when the parts are coupled. Another example is tooth systems which likewise engage with one another by axial movement. In this case, the teeth of one part engage in the recesses between the teeth of the other part when coupling is established. One known exemplary embodiment is the Hirth tooth system in which the two parts have a toothed ring of the same diameter, said toothed ring extending around the center axis and at least one of the two parts performing a linear movement in the direction of said center axis in the event of coupling or decoupling.

In coordinate measuring devices and machine tools, it is often desirable to be able to reliably establish whether the coupling has been completely established in the predefined manner. By way of example, it is possible for the projecting regions on one part and the corresponding cutouts in the other part to not be completely engaged with one another because the parts are tilted. In the case of rotary joints, which can be coupled-in in different rotation positions, it is also desirable to be able to establish whether the joint is in the coupled-in state (in which the two parts of the joint are coupled to one another) or in the uncoupled state (in which the parts are not coupled to one another). Furthermore, in the case of rotary joints with several possible rotation positions, the question of whether a rotation position in which the parts which are not yet coupled to one another can be coupled to one another by linear movement in the axial direction has been reached is of interest. By way of example, this is only possible in the case of the Hirth tooth system when the tips of the teeth are opposite the recesses between the teeth of the other part.

One way of establishing the coupled state is to check whether it is possible for an electric current to flow from one part to the other part. To this end, additional electrical contacts are fitted to the two parts or the surface regions which butt against one another in the coupled state and form the mentioned projections and recesses or cutouts are designed as electrically conductive surfaces and are accordingly electrically connected. Additional electrical contacts have the disadvantage that they cannot unambiguously identify the coupling state which is to be reproducibly established because they are not part of the mechanical bearing means. If the mechanical bearing means itself is used for making electrical contact, false alarms may likewise occur since electrical contact is also established, under certain circumstances, in the case of tilted coupling which does not correspond to the predefined, desired relative position of the parts which are to be coupled. Therefore, in the case of a three-point bearing, at least two of the three predefined contact points of the mechanical bearing means each had to be provided with the electrical contact measurement means. However, it is in no way possible to establish the relative position which the two parts which are to be coupled are in if electrical contact has not yet been established, that is to say if the parts are not yet in mechanical contact with one another, with an electrical contact measurement of this kind. In addition, the expenditure on additional electrical contacts or electrical connections on the parts which are to be coupled cannot be ignored. Additional electrical connections may be undesirable particularly in the case of small components and in the case of high-precision components.

SUMMARY OF THE INVENTION

It is accordingly an object of the invention to provide a method and a device for detecting the coupling of a part to a machine which overcome the above-mentioned disadvantages of the heretofore-known devices and methods of this general type and which enable the coupling state of the two parts which are to be coupled to one another to be determined. It is a particular object that it should be possible to reliably detect the uncoupled state. It is another object to enable detection of a predefined relative position of the parts in the uncoupled state of the parts.

With the foregoing and other objects in view there is provided, in accordance with the invention, a method of determining at least one of a coupled state or a decoupled state of a part to a machine, for example a coordinate measuring device or a machine tool. The method comprises:

determining a coupling state of the part to be coupled to the machine at a given contact region of the machine, wherein the part is movable in an axial direction in order to establish the coupled state, and movable away from the contact region in the axial direction in order to establish the decoupled state;

generating a sensor signal with a magnetoresistive sensor, the sensor signal being dependent on an axial position of the part relative to the contact region;

evaluating the sensor signal to determine whether the part is coupled to the contact region of the machine or to determine if the part is decoupled from the contact region;

wherein the part to be coupled to the machine is a first part and the contact region is formed by a second part, and at least one of the first and second parts having a projection region projecting in the axial direction and engaging in a corresponding receptacle in the respective other part in the coupled state;

wherein the first and second parts are rotatable relative to one another about the axial direction allowing the at least one projecting region to engage in a corresponding receptacle in the respective other part in one of a plurality of rotational positions, to thereby couple the first part to the second part in any of the plurality of rotational positions;

generating a further sensor signal with the magnetoresistive sensor, the further sensor signal being dependent on a relative rotational position of the first and second parts; and evaluating the further sensor signal to obtain information concerning the rotational position of the first part relative to the second part.

In other words, according to a basic concept of the present invention, a magnetoresistive sensor is used. The sensor is preferably positioned and oriented relative to the parts, which are to be coupled to one another, in such a way that a predefined relative position of the parts and/or a rotation position of the parts in relation to a rotation axis can be identified by sensor signals from the sensor. As an alternative or in addition, the sensor can be positioned and oriented and also designed relative to the parts in such a way that it detects relative positions of the parts and/or rotation positions of the parts in relation to the rotation axis in a range of relative positions and outputs corresponding sensor signals. The positioning and orientation of the sensor relative to the parts which are to be coupled to one another can be realized, in particular, by the sensor being fastened to one of the parts or the part and the sensor being connected to one another by means of a fastening means. In this case, the position and orientation of the sensor relative to the part does not change. Only the other part leads to different sensor signals, depending on the relative position and/or rotation position of said sensor in relation to the other part. In other words, the part which is not fixedly connected to the sensor changes the magnetic field which is detected by the sensor.

The parts which are to be coupled to one another can be, in particular, the above-mentioned parts, for example a sensing device and the arm or the sensor of the coordinate measuring device to which the sensing device is to be coupled.

In particular, the signal from the sensor can unambiguously correspond to the magnetic field strength of the magnetic field which prevails at the site of the sensor. As an alternative however, the sensor can also generate sensor signals as a function of the direction of the magnetic field lines or as a function of the gradient of an inhomogeneous magnetic field which prevails at the site of the sensor.

According to a particularly preferred embodiment, the magnetoresistive sensor detects both a relative position of the two parts which are to be coupled to one another in relation to an axial direction in which the parts are moved in a straight line relative to one another, in order to couple the parts or to separate said parts from one another, and also detects a relative rotation position of the parts in relation to a rotation axis which is oriented in the direction of the axial direction. When the rotation position of the two parts in relation to a rotation axis is mentioned in the text which follows, said rotation position is a rotation position relative to one another. If, for example, both one part and the other part are rotated through 180° about the rotation axis, the same rotation position is reached again. However, in practice, for example in the case of rotary joints, only one part is often rotated while the other part is held fixed in relation to the surrounding area, that is to say is not rotated. In addition, often only one of the parts is moved in the axial direction in practice for coupling or decoupling purposes. However, if the sensor is fixedly positioned and oriented relative to one of the two parts, the sensor signal which is generated by the sensor depends only on the relative position and the relative rotation position.

The use according to the invention of a magnetoresistive sensor makes it possible to detect both the axial relative position of the two parts which are to be coupled and also the relative rotation position. Therefore, it is possible to identify in a particularly reliable manner whether the parts are actually in the desired coupled state, that is to say are coupled to one another. If the parts are not coupled to one another, this can be determined from the sensor signals and, by detecting and evaluating the relative rotation position, it is possible to establish whether desired, predefined coupling of the parts can be achieved by executing a linear, straight movement of the parts toward one another in the axial direction. For example, in the case of a three-point bearing, it is possible to establish whether the three-point bearing can be achieved by the linear movement. If the three-point bearing can have different states, that is to say the parts can be coupled to one another by the three-point bearing in different relative rotation positions, evaluation of the sensor signals can be used to reliably establish which coupling state is reached when the parts are coupled to one another by linear movement. The same applies for tooth systems, for example a Hirth tooth system. In this case, it is possible to establish, in particular by evaluating the sensor signals from the sensor, whether the Hirth tooth system can be established by linear movement without damaging the tooth system and/or without undesirable constraining forces being generated. Constraining forces of this kind would occur, for example, if the tooth tips of one toothed ring are not opposite the deepest points between the teeth of the other toothed ring. Damage could occur if the tooth tips of the two toothed rings are exactly opposite one another.

Irrespective of the type of mechanical interfaces, for example a three-point bearing or a Hirth tooth system, the current relative rotation position of the two parts which are to be coupled to one another can take place by evaluating the time profile of the sensor signals which are generated continuously or virtually continuously by the sensor and which are generated during a rotary movement of the parts relative to one another about the rotation axis. For example, in the case of a Hirth tooth system, the sensor signals which are generated by the sensor can be identical if rotation of one of the toothed rings has taken place through one tooth period, that is to say through a rotation angle which corresponds to the tooth spacing. If one of the toothed rings executes a rotary movement of this kind through one tooth period, the sensor signal also executes a periodic change, that is to say changes and again arrives at the same signal state as at the beginning of the period. A corresponding evaluation device is therefore preferably designed such that it can establish such periodic changes in the sensor signal. If, for example, a rotation through 1.5 tooth periods takes place, the evaluation device, after a tooth period is run through, detects the completion of the period and then detects that a further half period has been run through. In this case, the evaluation device can be designed to check only the correct execution of the rotary movement, but the evaluation device can also be coupled to a control device which controls the rotary movement (and/or, in another exemplary embodiment, the movement in the axial direction), and the control device can control the rotary movement (and/or the movement in the axial direction) as a function of the detection results from the evaluation device, in particular terminate the movement. In the case of the rotation through 1.5 tooth periods for example, the control device can terminate the rotary movement as soon as it receives a signal from the evaluation device indicating that the rotary movement through 1.5 tooth periods is complete. The above-mentioned exemplary embodiments for a rotary movement through 1.5 tooth periods correspondingly apply for rotary movements about another multiple or a non-integer multiple of tooth periods. For example, in the case of a Hirth tooth system with 30 teeth per toothed ring, half a revolution about the rotation axis may be desirable. In this case, the evaluation device would detect that the sensor signal has run through 15 periods. When the evaluation device actuates the control device, it can either output the information about the periods which have been run through (for example 1.5 or 3.2) to the control device or output a stop signal when the desired number of periods or non-integer multiples of a period are run through.

The use according to the invention of a magnetoresistive sensor can be combined with a further sensor. The further sensor can be a further magnetoresistive sensor. In this way, redundant signals, which increase the reliability of the identification, can be generated for example. As an alternative or in addition, the identification of a coupled state of the parts and/or a decoupled state of the parts and/or a relative rotation position can be combined with a Hall sensor which utilizes the Hall effect. A still further additional or alternative option for detecting the coupled or decoupled states is the use of a light barrier. It is also possible to use a Hall sensor instead of a magnetoresistive sensor. The manner in which the magnetic field at the site of the sensor changes is also established in the case of a Hall sensor. In this respect, magnetoresistive sensors and Hall sensors are combined under the common heading "magnetic sensors". However, for the intended application in this case, magnetoresistive sensors provide signals with a high signal-to-noise ratio. Furthermore, magnetoresistive sensors are particularly suited to miniaturization, with a signal with a very good signal-to-noise ratio nevertheless being generated. In contrast, the miniaturization of Hall sensors leads to considerably poorer signal qualities.

The invention proposes, in particular, a method for determining a coupled state and/or a decoupled state of a part, which can be coupled, of a machine, in particular of a coordinate measuring device or a machine tool, it being possible for the part which can be coupled to be moved toward a contact region of the machine in an axial direction in order to establish the coupled state, and to be moved away from the contact region in the axial direction in order to establish the decoupled state, with a magnetoresistive sensor being used to generate a sensor signal which is dependent on an axial position of the part which can be coupled, the generated sensor signal being evaluated and the result being used to determine whether the part which can be coupled is coupled to the contact region of the machine and/or whether the part which can be coupled is decoupled from the contact region.

With the above and other objects in view there is also provided, in accordance with the invention, a configuration for determining whether a part is coupled to or decoupled from a machine, the configuration comprising:

a first part being the part to be coupled to the machine;

a second part having a contact region of the machine for coupling said first part, said first part being movably disposed relative to said contact region in an axial direction in order to establish a coupled state, and to be moved away from said contact region in the axial direction in order to establish a decoupled state;

a magnetoresistive sensor configured and positioned to generate a sensor signal that is dependent on an axial position of said first part;

an evaluation device configured to receive the sensor signal from said magnetoresistive sensor and to evaluate the sensor signal and to use the evaluation to determine whether said first part is coupled to said contact region of the machine or said first part is spaced apart from said contact region;

one or both of said first and second parts having at least one projection region projecting in the axial direction and engaging in a corresponding receptacle in the respectively other of said first and second parts in the coupled state;

one of said first and second parts being rotatably supported relative to another one of said first and second parts about the axial direction and said at least one projecting region in each case engaging in a corresponding receptacle in the respective other part in a plurality of rotational positions, so that said first part can be coupled to said second part in any of the plurality of rotational positions; and said magnetoresistive sensor being configured and positioned to generate a further sensor signal that is dependent on a relative rotational position of said first and second parts; and said evaluation device being configured to receive and evaluate the further sensor signal and obtain therefrom information about the rotational position of the first and second parts relative to one another.

In other words, the invention also proposes a configuration for determining a coupled state and/or a decoupled state of a part, which can be coupled, of a machine, in particular of a coordinate measuring device or a machine tool, with the configuration having the first part, which can be coupled, and a second part, with the second part having a contact region of the machine for coupling the first part, it being possible for the part which can be coupled to be moved toward the contact region in an axial direction in order to establish the coupled state, and to be moved away from the contact region in the axial direction in order to establish the decoupled state, with the configuration having a magnetoresistive sensor which is designed and positioned in such a way that it generates a sensor signal which is dependent on an axial position of the first part, with the configuration having an evaluation device which is designed to evaluate the generated sensor signal and to use the result to determine whether the part which can be coupled is coupled to the contact region of the machine and/or whether the part which can be coupled is spaced apart from the contact region.

The invention described and claimed herein also includes a machine or installation having the configuration assembly, in particular a coordinate measuring device.

The contact region of the machine is understood to mean, in particular, a surface region with which the first part which can be coupled is in mechanical contact in the coupled state. Contact is generally not made over the entire surface of this contact region. Rather, for example in the case of a three-point bearing, contact is made between the two coupled parts only at three points or pairs of points. In the case of a Hirth tooth system, many of the flanks of the teeth are generally in mechanical contact with the flanks of the toothed ring of the other part. In many cases, the surfaces at which the parts which are coupled to one another make mechanical contact are located substantially in one plane or in a flat disk-like region which is delimited by planes. The axial direction in which the parts which are to be coupled to one another are moved in a straight line during coupling or decoupling runs perpendicular or virtually perpendicular to the plane or the planes of the disk-like region. In the case of a three-point bearing, the three points (or in the case of cylindrical or spherical pairs, pairs of points) are situated substantially in a plane of this kind. In the case of a Hirth tooth system, the flanks at which the teeth of the various parts come into contact are situated in a disk-like region of the mentioned type, with the flat boundary surfaces of this disk-like region merely being imaginary surfaces which do not run along contact surfaces in this case.

The sensor signal of the magnetoresistive sensor is dependent, in particular, on the axial position of the part which can be coupled, that is to say a different sensor signal is generated in a different axial position. This applies at least to a range of axial positions. However, the situation of different axial positions generating the same sensor signal is not entirely precluded, depending on the configuration and orientation of the magnetoresistive sensor. However, in this case, it is possible to reliably identify the axial position in which the part is located by evaluating the time profile of the generated sensor signals during an axial movement of the part which can be coupled. To this end, as in the case of the above-described evaluation of the time signal profile in the case of rotations, information about how the sensor signal changes during an axial movement or rotary movement can be present (for example corresponding digital data can be stored). The current axial position or relative rotation position of the parts can be determined, in particular, by comparison with the known information. The axial position is understood to mean the position in the axial direction in which the part which can be coupled is moved during coupling or decoupling. If the movement of the part which can be coupled is under discussion, this includes the case of a relative movement in which both parts are moved.

As mentioned above, the situation of whether the part which can be coupled is coupled to the contact region of the machine and/or whether the part which can be coupled is spaced apart from the contact region, that is to say is decoupled, is determined in particular. Determining whether the part which can be coupled is spaced apart from the contact region includes the case in which the relative position of the two parts which are to be coupled to or decoupled from one another is determined from the sensor signals and does not establish only that the part is decoupled.

The use of at least one magnetoresistive sensor has the advantage that no electrical contacts are required between the parts which are to be coupled. Magnetoresistive sensors of very small construction, for example in the form of integrated circuits, are available and can therefore be fastened, for example fixedly bonded, in a simple manner and without having a significant adverse effect on the structure of the coupling to one of the parts.

Although parts which are to be coupled to one another and are produced from a magnetic or magnetized material (for example iron-containing metal) in particular have a particularly significant influence on the magnetic field prevailing at the site of the sensor, the material of the parts does not have to be metal or another magnetized or magnetic material. Rather, other materials also change magnetic fields on account of their magnetic permeability. The use of the at least one magnetoresistive sensor is therefore not restricted to magnetic or magnetized materials for the parts which are to be coupled.

As already mentioned, it is particularly advantageous to use a magnetoresistive sensors if the first and the second part which are to be coupled to one another can be rotated relative to one another about the axial direction. In this respect, the axis which corresponds to the axial direction is the rotation axis. This is the case, for example, in rotary joints which can be coupled-in and uncoupled. In the embodiment, at least one part (the first part and/or the second part) has, as already mentioned above, at least one projecting region which, in the coupled state, engages in a corresponding receptacle in the other part. The projecting part is, for example, a spherical surface region which, in the coupled state, is arranged between two parallel cylindrical regions of the other part, so that substantially two points of the ball are in contact with the other part, specifically in each case one point is in contact with each of the cylinders. In the case of the Hirth tooth system, the projecting regions are the teeth of the toothed rings. In this preferred embodiment, the magnetoresistive sensor is used not only to determine the axial position of the part which can be coupled but also to generate a sensor signal which is dependent on the relative rotation position of the first and second part. The generated sensor signal can therefore be evaluated and information about the rotation position can be obtained from the result of said evaluation. Examples have already been discussed.

In particular, evaluation of the generated sensor signal can be used to determine whether the first and the second part are located relative to one another in a predefined rotation position which allows the first part to be coupled to the second part by movement in the axial direction.

The configuration contains a corresponding evaluation device which is designed to evaluate the generated sensor signal, preferably optionally to also evaluate the time profile of the generated sensor signal.

The term magnetoresistive (MR for short) sensor is a collective term for sensors in which an electrical resistance of an electric circuit of the sensor changes under the influence of a magnetic field. In this case, various physical manners of operation lead to the change in resistance. Magnetic field angles, magnetic field strengths or magnetic field gradients, for example, can be detected depending on the design of the MR sensor. A physical manner of operation is, for example, the anisotropic MR effect (AMR for short) which occurs in ferromagnetic materials which have a specific resistance which changes with the angle between the direction of the magnetic field and the direction of current. Another physical manner of operation is the tunnel MR effect according to which the tunnel resistance between two ferromagnetic layers changes as a function of the angle of magnetization of the two layers. According to a yet further physical manner of operation, the giant MR (GMR) effect, the electrical resistance of two thin ferromagnetic layers, which are separated by a thin non-magnetic layer, changes as a function of the angle of the magnetization in the two ferromagnetic layers in relation to one another and provides changes in resistance of up to 50%. The electrical resistance is highest in the case of antiparallel magnetization of the thin ferromagnetic layers. In this case, the change in resistance is not dependent on the direction of current. On account of several layers with different properties and magnetizations being stacked, the characteristic curves of GMR sensors are determined by their construction. This permits targeted adaptation of the characteristic curves to the requirements of a measurement application. A yet further physical manner of operation is the colossal MR (CMR) effect. This effect occurs in the case of manganese-based oxides, the electrical resistance of which changes as a function of a magnetic field.

MR sensors can be realized as electric circuits using thin-film technology, for example circuits on a printed circuit board. However, the circuit can also be realized in a different way in principle. By way of example, microelectronic integrated circuits can also be used as the electric circuit of the sensor as an alternative or in addition. In addition to the electric circuit, many MR sensors also have one or more permanent magnets. The relative position and orientation of the electric circuit on the one hand and the at least one permanent magnet on the other are either fixedly predefined or adjustable in this case. In this case, the sensor principle is based on external influences changing the magnetic field which is generated by the at least one permanent magnet. This leads to a changed magnetic field in the region of the electric circuit which is detected by the electric circuit, that is to say the electric circuit generates a corresponding sensor signal. A solenoid can also be used instead of a permanent magnet. However, in a specific sensor configuration, it is possible, as an alternative, for the at least one magnet to be fastened to an object and/or for this object itself to be magnetic and/or for the configuration to be located in an external magnetic field. Therefore, the MR sensor does not necessarily have to have a magnet.

In general, the MR effect allows weak magnetic fields to be detected and in the process provides a signal with a very advantageous signal-to-noise ratio. AMR and/or GMR sensors which are commercially available, for example, from Sensitec GmbH of Lahnau-Waldgirmes, Germany, are preferred for the present invention. TMR sensors can also be used for the invention.

Other features which are considered as characteristic for the invention are set forth in the appended claims.

Although the invention is illustrated and described herein as embodied in detecting the coupling of parts to a machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 9 shows a toothed ring of a Hirth tooth system, FIG. 10 schematically shows two parts which can be coupled to one another by means of a tooth system, and a configuration for determining the relative position of the two parts and for controlling the movement of one of the two parts as a function of sensor signals from a magnetoresistive sensor, FIG. 11 schematically shows the two parts which can be coupled to one another and are illustrated in FIG. 10, and an embodiment of a magnetoresistive sensor and a magnet, with the sensor being arranged level with the axial position which, when the two parts are in the coupled state, is situated in a center plane of the coupling.

DETAILED DESCRIPTION OF THE INVENTION

Figure 1:
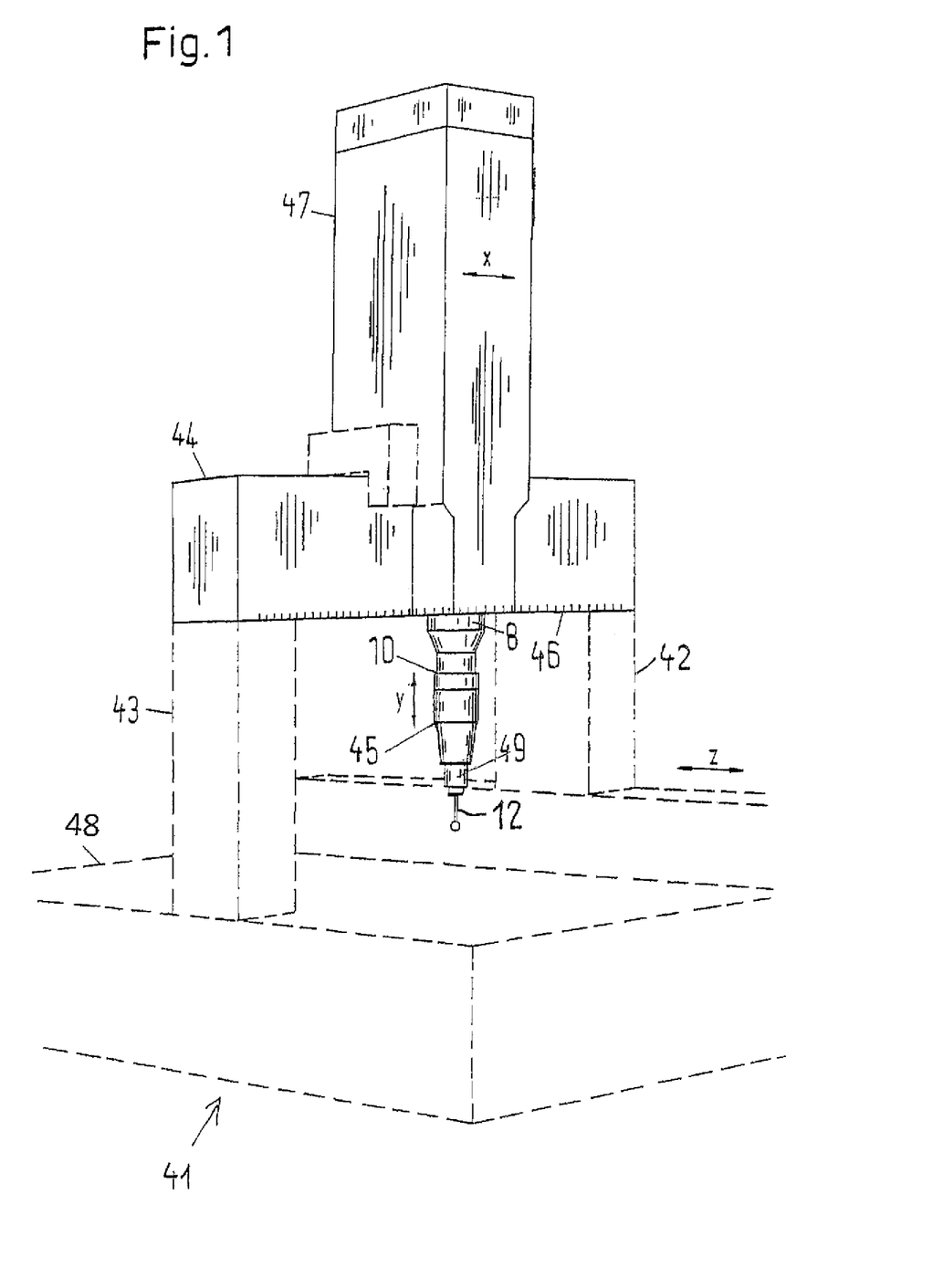
FIG. 1 shows a coordinate measuring device of portal-type design having a sensor and a sensing device coupled to said sensor.

Referring now to the figures of the drawing in detail and first, particularly, to FIG. 1 thereof, there is shown a coordinate measuring device 41 of portal-type design, which is an example of a machine to and from which parts can be coupled and decoupled. The coordinate measuring device 41 has a measuring table 48 on which two supports 42, 43 of the portal are arranged such that they can move in the z-direction. A crossmember 44 is situated on the supports 42, 43 and a carriage 47 can be moved in the x-direction relative to said crossmember, with the z-direction and the x-direction being oriented horizontally and perpendicular to one another. A scale 46 can be seen at the lower edge of the crossmember 44, said scale being used to determine the position of the carriage 47 in the x-direction. A vertical configuration which can be moved in the y-direction can also be seen relative to the carriage 47. This configuration has a support 8 to which a sensor 45 is fastened in an exchangeable manner by means of a coupling device 10. A receptacle or holder 49 for coupling sensing pins in an exchangeable manner can also be seen at the lower end of the sensor 45. In the illustrated case, a sensing pin 12 is coupled to the sensor 45 by means of the receptacle 49.

The coupling state, in particular the coupled state which is produced in the correct, predefined manner, and the decoupled state can be established by a magnetoresistive sensor. Another exemplary embodiment of parts which are to be coupled will be discussed with reference to the following figures. The principle of using a magnetoresistive sensor described in this case can, however, also be transferred to the couplings of the sensor 45 to the support 8 and of the sensing pin 12 to the sensor 45.

Figure 2:
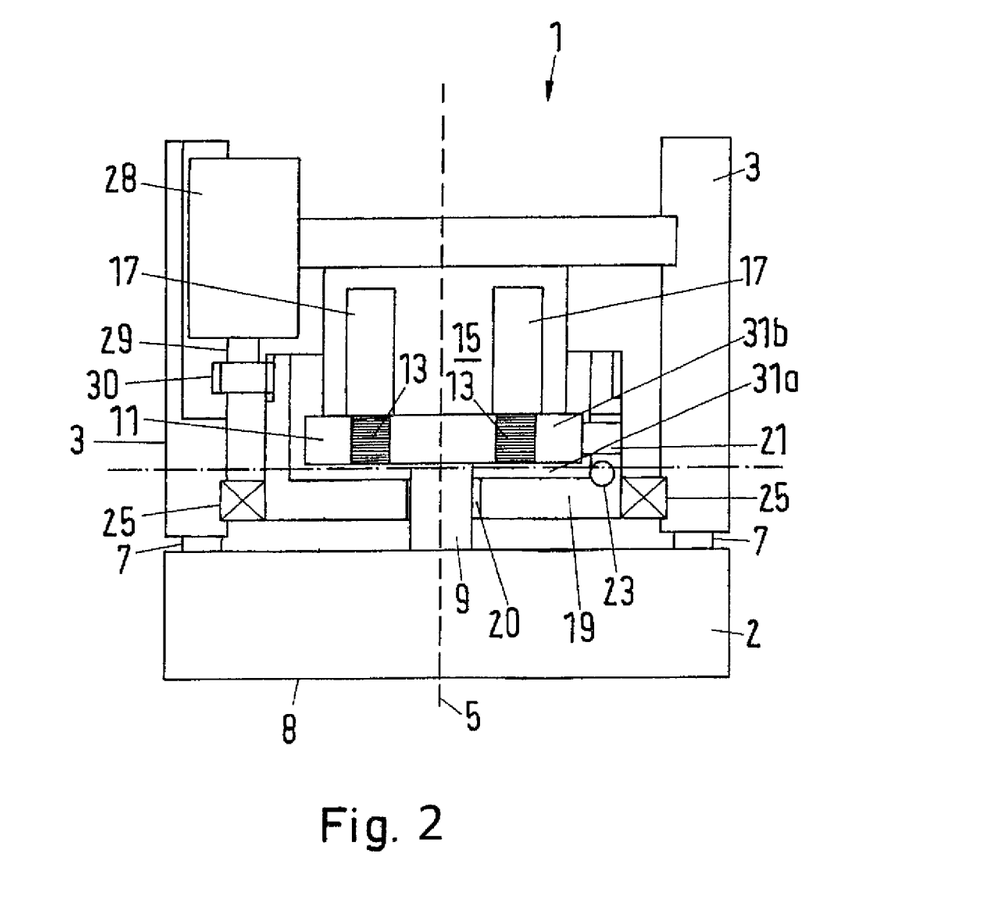
FIG. 2 shows an axial longitudinal section through a motor-operated rotary joint.

FIG. 2 shows an axial longitudinal section through a motor-operated rotary joint which can be fastened, for example, to the support 8 (FIG. 1). A first part 2 is mounted such that it can be rotated about a rotation axis 5 which is illustrated vertically in FIG. 2. However, in the state illustrated in FIG. 2, the part 2 cannot be rotated because it forms a toothed connection with, and is therefore coupled to, a second part 3 by means of a tooth system 7. The tooth system 7 may be, in particular, a Hirth tooth system. An example of a Hirth tooth system and coupling states of a tooth system will be discussed in greater detail. The use of a magnetoresistive sensor as described in this case can also take place in the tooth system 7 illustrated in FIG. 2.

The second part 3, like the first part 2, is designed and arranged to be substantially rotationally symmetrical about the rotation axis 5. However, the second part 3 has space in its interior for further parts of the rotary joint. A drive motor 28 is coupled to an annular drive element 19 by means of a shaft 29 which has a drive pinion 30 at its lower end. The drive element 19 is likewise designed and arranged to be substantially rotationally symmetrical about the rotation axis 5 and is mounted such that it can rotate relative to the second part 3 by means of a rotary bearing 25. If the drive motor 28 drives the pinion 30, the pinion 30 drives the drive element 19 by means of a toothed ring which is formed on the outer circumference of the drive element 19. In this case, the toothed ring is located at the top of the upper region of the drive element 19 in FIG. 2 and FIG. 3, said upper region being U-shaped in the illustrated section and being hollow in its inner region.

The first part 2 is connected to a part 11, which is in the form of a circular disk, by means of a shaft 9 which is of rotationally symmetrical design and is arranged coaxially to the rotation axis 5, with the shaft 9 extending through a cylindrical cutout in the drive element 19 and with the part 11 which is in the form of a circular disk being arranged in the interior of the upper region 35 of the drive element 19. The first part 2, the shaft 9 which is fixedly connected to it and the part 11 which is likewise fixedly connected to the shaft 9 and is in the form of a circular disk can be axially moved in the axial direction which is defined by the longitudinal direction of the rotation axis 5. This axial movement is achieved by a solenoid 17 which acts on the magnetic regions 13 in the part 11 which is in the form of a circular disk. In the state illustrated in FIG. 2, the solenoid 17 attracts the part 11, so that the part 11 bears against the region 15 in which the solenoid 17 is arranged. Therefore, an air gap 31a is produced between the surface of the part 11, which surface is illustrated at the bottom in FIG. 2, and the drive element 19.

Figure 3:
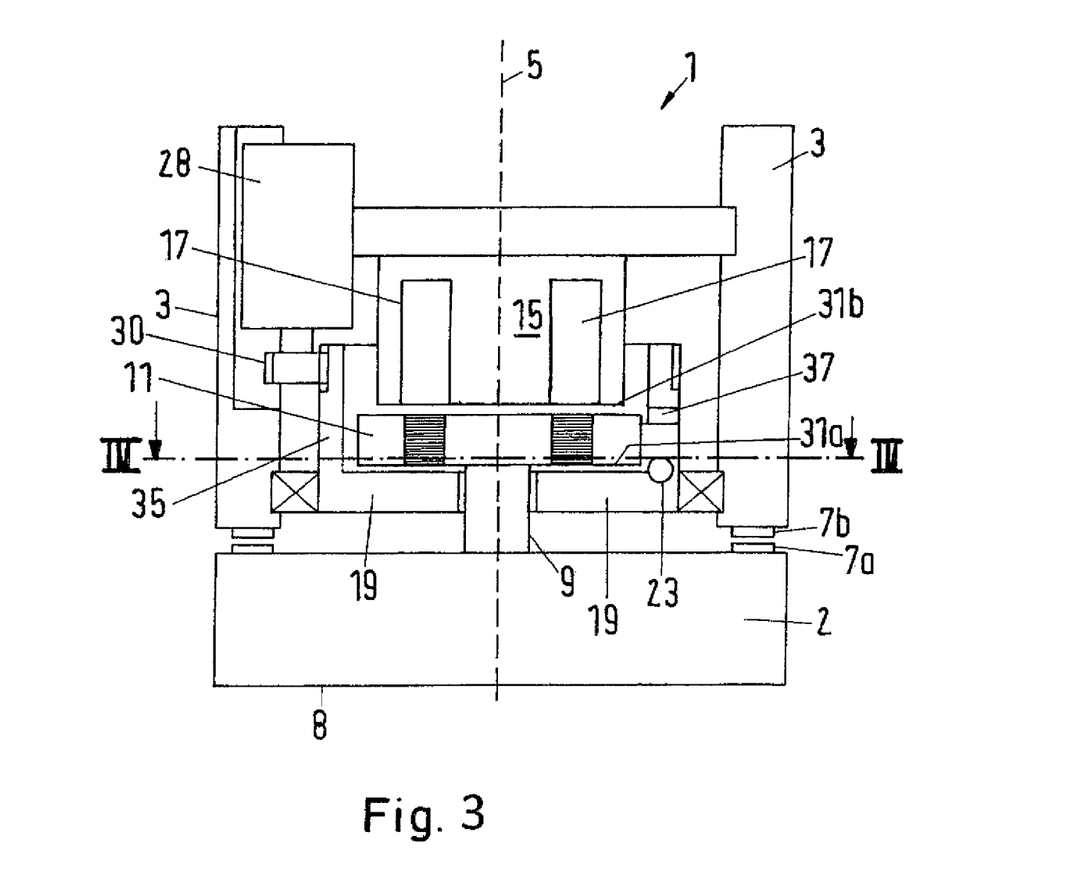
FIG. 3 shows the rotary joint from FIG. 2, with an axially moving part located in another axial position.

In contrast, the combination of parts 2, 9 and 11 in the axial position illustrated in FIG. 3 is at a distance from the region 15, so that an air gap 31b is produced between the surface of the part 11 and the region 15. The air gap 31a between the lower surface of the part 11 and the drive element 19 has reduced in size but is not completely closed. However, a coupling of the part 11 which, in the exemplary embodiment, is realized by three cylindrical parts 21 which point radially outward on the outer circumference of the part 11 by way of their cylinder axes, engages with corresponding pairs 23 of balls which are arranged on the drive element 19. A three-point bearing is achieved as a result.

Figure 4:
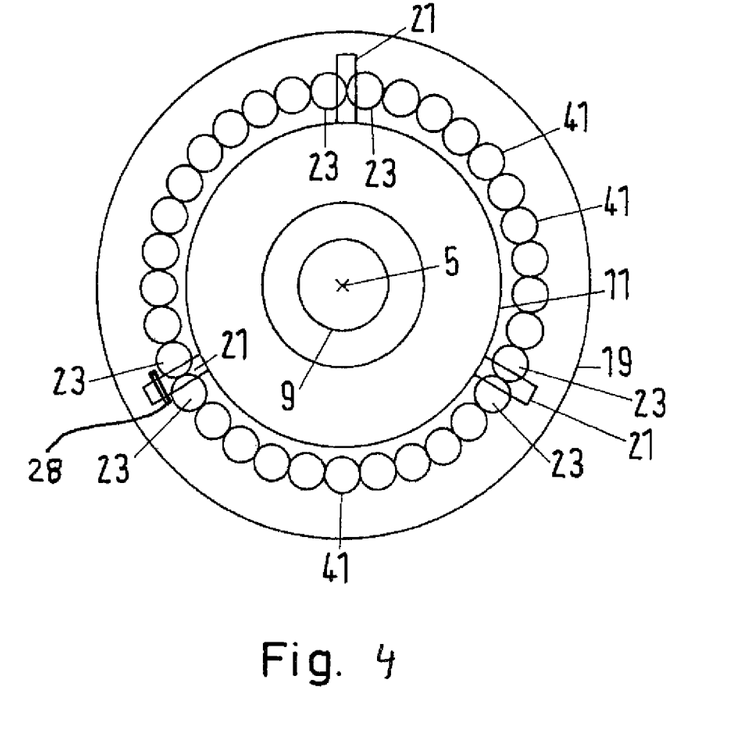
FIG. 4 shows a cross section along line IV-IV in FIG. 3 through a central region of the rotary joint which is illustrated in FIG. 3, with two parts which can be coupled to one another being illustrated in the coupled state.

This three-point bearing is shown in FIG. 4. In the exemplary embodiment, not only pairs of balls but also a ring which is formed by a large number of balls 23, 41 are provided for each of the cylinders 21. This means that, in many different rotation positions, the cylinders 21 can be positioned relative to the balls 23 of the ring of balls in such a way that they each make contact with two adjacent balls 23 at one point. In FIG. 4, the pairs of balls which are in mechanical contact with the cylinders 21 are denoted by reference sign 23, while other balls of the ring are denoted by reference sign 41.

The coupling state (in particular the coupled state and/or the decoupled state) of the coupling illustrated in FIG. 4 or another three-point bearing can also be monitored with the aid of a magnetoresistive sensor. To this end, a magnetoresistive sensor 28 is fastened to the radially outer region of one of the cylinders 21 by way of example, as illustrated in FIG. 4. The sensor can have, in particular, a permanent magnet. When the cylinder 21 is in the position coupled to the pair 23 of balls, the balls 23 change the magnetic field of the magnet in a characteristic manner, so that a corresponding characteristic sensor signal is generated by the sensor 28. This, for example previously known, signal can be detected and it is possible to establish that the cylinder 21 is coupled to the pair 23 of balls as a result of said detection operation. At least one further cylinder of the total of three cylinders 21 can optionally be provided with a magnetoresistive sensor in the same way. This makes it possible to establish that not only one cylinder 21, but two or more cylinders 21 are in contact with a pair 23 of balls.

Figure 5:
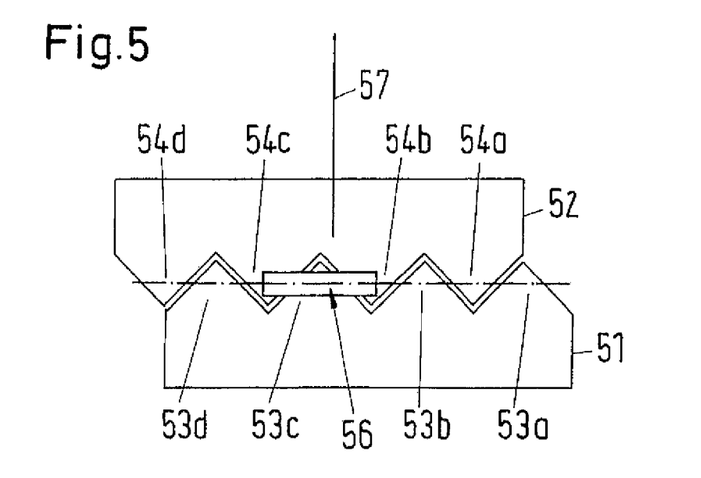
FIG. 5 shows a portion of a tooth system of a first and a second part, with a magnetoresistive sensor being arranged in the region of the tooth system.

FIG. 5 shows a side view of a portion of a tooth system, it being possible for said portion to be a portion of a Hirth tooth system. A first part 51 is illustrated at the bottom of FIG. 5, the four illustrated teeth 53a, 53b, 53c, 53d of said first part pointing upward by way of their tips. In the coupled state illustrated in FIG. 5, said teeth engage in recesses or cutouts between four teeth 54a, 54b, 54c, 54d which project downward from the second part 52. In this case, the tooth 53a in the illustration of FIG. 5 is in contact with the tooth 54a of the second part 52 only at one of its two flanks. In the case of a complete Hirth tooth system, the tooth 53a would also be in contact with the adjacent tooth of the tooth 54a by way of its other flank. The center plane, which is at the same distance from the tooth tips of the teeth 53 and from the tooth tips of the teeth 54 at the top and bottom when the tooth system is coupled, is illustrated by a dash-dotted horizontal line in FIG. 5 and FIG. 6. The axial direction in which at least one of the parts 51, 52 is moved during coupling and decoupling is illustrated in FIG. 5 by a vertical line with the reference symbol 57.

The magnetoresistive sensor 56 is arranged axially level with the center plane. The positioning of the magnetoresistive sensor at this axial level or in this axial position has proven highly suitable for detecting the coupled state. The magnetoresistive sensor in this axial position is also suitable for detecting the relative rotation position of the first and second part when the first and the second part are not coupled to one another and when the axial distance between the parts is not too great. The reason for this is that the teeth of the part to which the sensor is not fastened also influence the magnetic field which is detected by the sensor.

Figure 6:
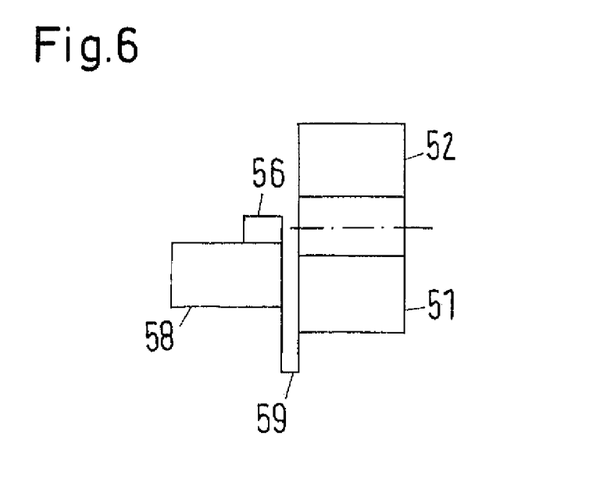
FIG. 6 shows a side view of the configuration which is illustrated in FIG. 5, with the direction of view in FIG. 6 being perpendicular to the direction of view in FIG. 5.

FIG. 6 shows a side view of the configuration from FIG. 5, with the sensor 56 being connected to a magnet 58, and with the combination comprising the sensor 56 and the magnet 58, as schematically illustrated in FIG. 6, being connected to the first part 51 by means of a fastening means 59. If the tooth system is a Hirth tooth system, it is preferred that the combination comprising the sensor 56 and the magnet 58 is arranged inside the toothed ring, that is to say between the toothed ring and the rotation axis. As a result, the sensor is protected by the toothed ring against possible damage and against maladjustment. However, the sensor cannot be arranged at exactly the same short distance from the toothed ring on the inside as it can on the outside. Therefore, a very small design of the sensor is preferred, for example a sensor produced using thin-film technology on a printed circuit board or an integrated circuit, in order to nevertheless allow the shortest possible distance from the toothed ring of the first part. The dimensions of the sensor should be small particularly in the circumferential direction, so that a short distance from the toothed ring is possible.

FIG. 6 also illustrates that the magnet 58, which generates the magnetic field, the change in this magnetic field being established by the sensor 56, is arranged beneath the sensor 56. Therefore, the magnetic field lines of the magnet 58 can change due to influences above the sensor 56. The second part is located there, above said sensor, the axial position of said second part relative to the first part being variable and the rotation position of said second part relative to the first part being variable. If the magnet were arranged in the same axial direction as the other part, to which the sensor is not fixedly connected, as seen from the sensor, the magnetic field at the site of the sensor would scarcely be influenced. Formulated generally, the magnet and the part to which the sensor is not fixedly connected are preferably located on opposite sides of the sensor in the axial direction.

Figure 7:
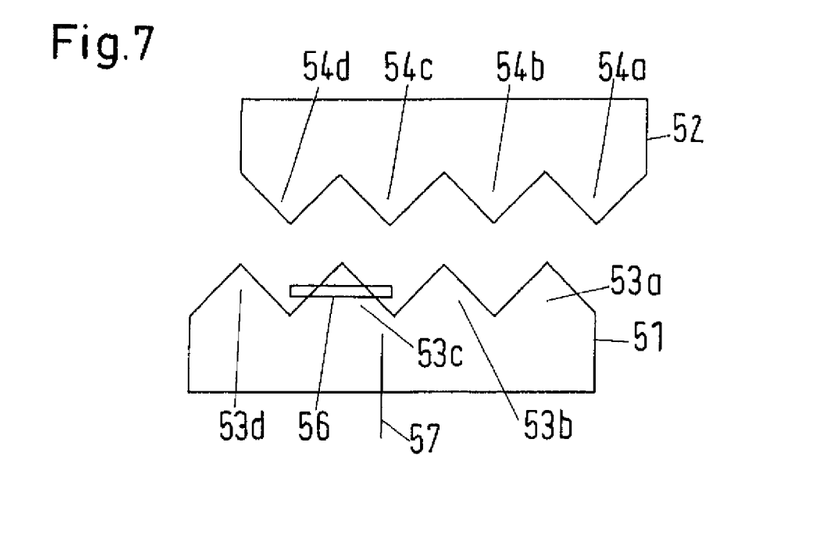
FIG. 7 shows the tooth system which is illustrated in FIG. 5 and FIG. 6 with the two parts which can be coupled in a different relative position.

FIG. 7 shows the same relative rotation position as in FIG. 5, with the "rotation position" relating to the case of a Hirth tooth system. Formulated generally, FIG. 7 shows the same lateral relative position, with "lateral" referring to a direction transverse to the axial direction 57. Expressed differently, the rotation position or the lateral relative position is not changed by a relative movement of the parts in the axial direction.

However, in the situation illustrated in FIG. 7, the parts 51, 52 are not in the coupled state which is illustrated in FIG. 5, but rather in the decoupled state. If the magnet (not illustrated in FIG. 7) is located beneath the sensor 56, as illustrated in FIG. 6, the magnetic field lines above the sensor 56 are not bundled by the material of the second part 52, as in the case of FIG. 5, if the material is magnetized material. Formulated generally, the material of the second part 52, which material is now arranged at a relatively great distance from the sensor 56, influences the magnetic field in a different way to in the coupled position from FIG. 5.

Figure 8:
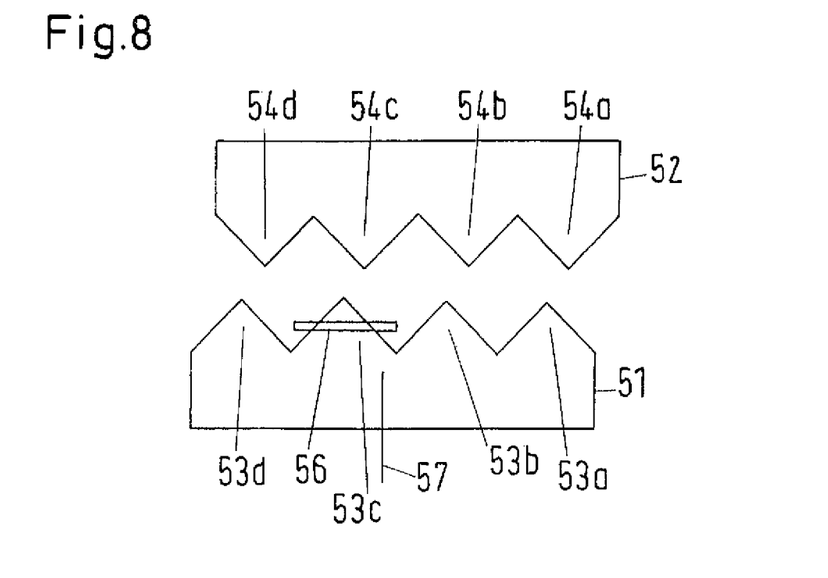
FIG. 8 shows the tooth system from FIGS. 5 to 7 in yet a further relative position of the parts.

FIG. 8 shows the parts 51, 52 in the same axial position, that is to say at the same axial distance from one another. However, the lateral position is changed with respect to the situation in FIG. 7. The downwardly pointing tooth tips of the teeth 54 are no longer in the same lateral position as the recesses between the teeth 53 of the first part 51. The coupling can no longer be achieved solely by a relative movement in the axial direction from the relative position of the parts 51, 52 illustrated in FIG. 8.

This changed lateral position can likewise be detected by the sensor 56 which is fastened to the first part 51. When the magnet (not illustrated in FIG. 8) is again located beneath the sensor 56, the magnetic field at the site of the sensor 56 is influenced in a different way, depending on whether (as illustrated in FIG. 7) the tips of the teeth 54c, 54d of the second part 52 are located above the right-hand-side and left-hand-side edge of the sensor 56 or whether (as illustrated in FIG. 8) only the tip of the tooth 54c of the second part 52 is positioned directly above the sensor 56.

Figure 9:
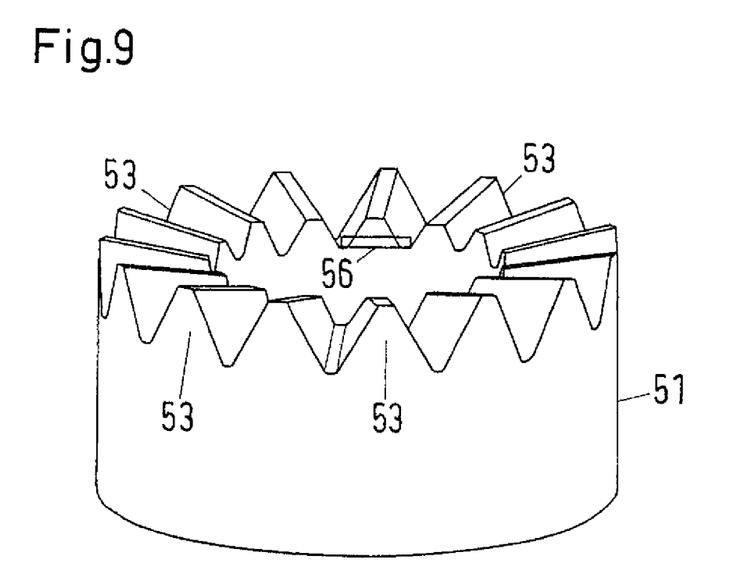

FIG. 9 shows a toothed ring of a Hirth tooth system. Analogously to the references used in FIGS. 5 to 8, the teeth are denoted by reference symbol 53. The toothed ring has a total of fifteen teeth, but only four of said teeth are denoted by reference symbol 53. As shown in the illustration, the teeth tips do not have to have sharp edges, as illustrated in FIGS. 5, 7 and 8, but rather can also be flattened. The sensor 56 is positioned on the inside of the toothed ring against one of the teeth 53.

Figure 10:
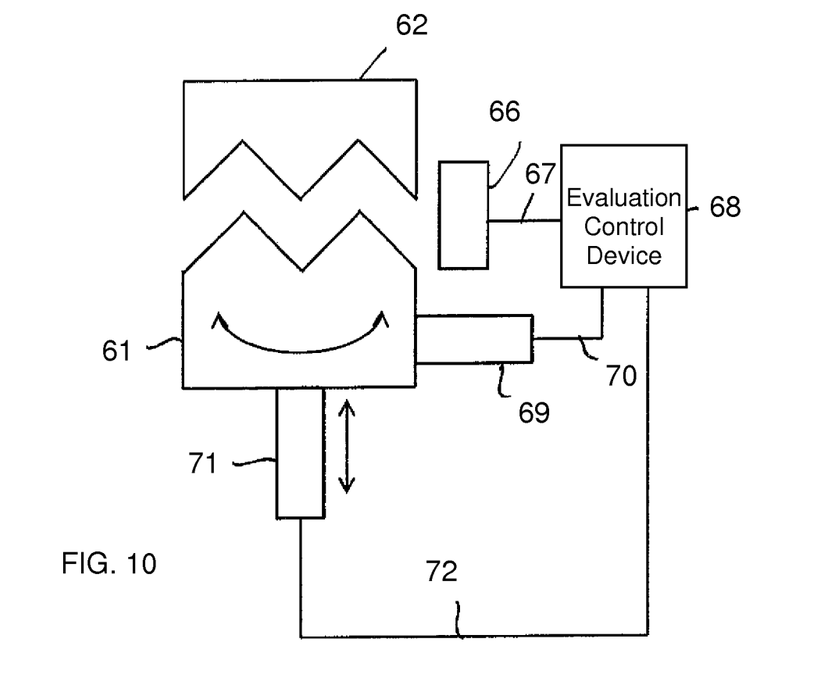

FIG. 10 schematically shows two parts 61, 62 which can be coupled to one another. Instead of the schematically indicated tooth system, the coupling can also be designed mechanically differently, for example in the manner illustrated in FIG. 4. A magnetoresistive sensor 66 is arranged so as to be fixed in position relative to the first part 61 and is connected to an evaluation and control device 68 by means of a signal line 67. Sensor signals of the sensor 66 are transmitted to the device 68 via the signal line 67. Furthermore, the device 68 is connected to a first actuator 69 (for example an electric motor) via a control line 70, it being possible for said actuator to drive a rotary movement of the first part 61, the relative rotation position of the parts 61, 62 in relation to one another being changed by virtue of said rotary movement. The device 68 is also connected to a second actuator 71 via a second control line 72, it being possible for said second actuator to cause an axial movement, that is to say a movement in the axial direction, of the first part 61.

Figure 11:
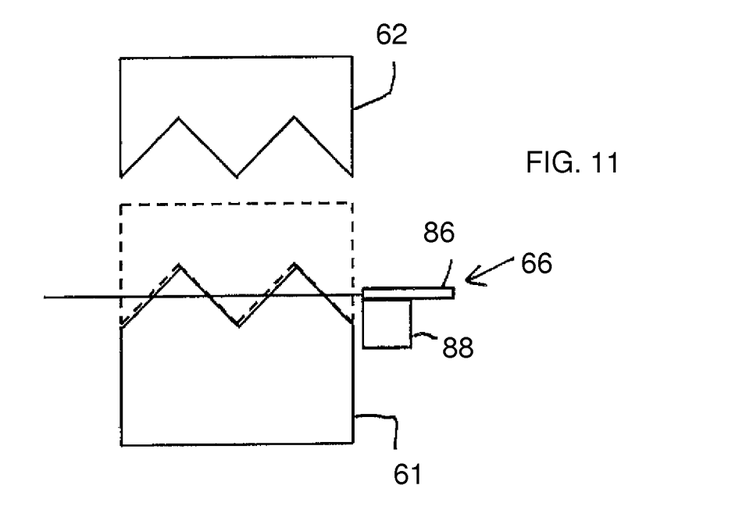

As shown in the specific exemplary embodiment of FIG. 11, the sensor 66 can have a printed circuit board 86 and a magnet 88. The electric circuit is mounted on the printed circuit board 86, said electric circuit having at least one resistor and the resistance value of said resistor being determined by the magnetic field prevailing at the site of the resistor. As indicated by a horizontal line, the printed circuit board 86 is once again arranged level with the center plane which is defined when the parts 61, 62 are coupled. The coupled state is illustrated by the first part 61 and the second part 62 in the illustration using dashed lines.

Figure 12:
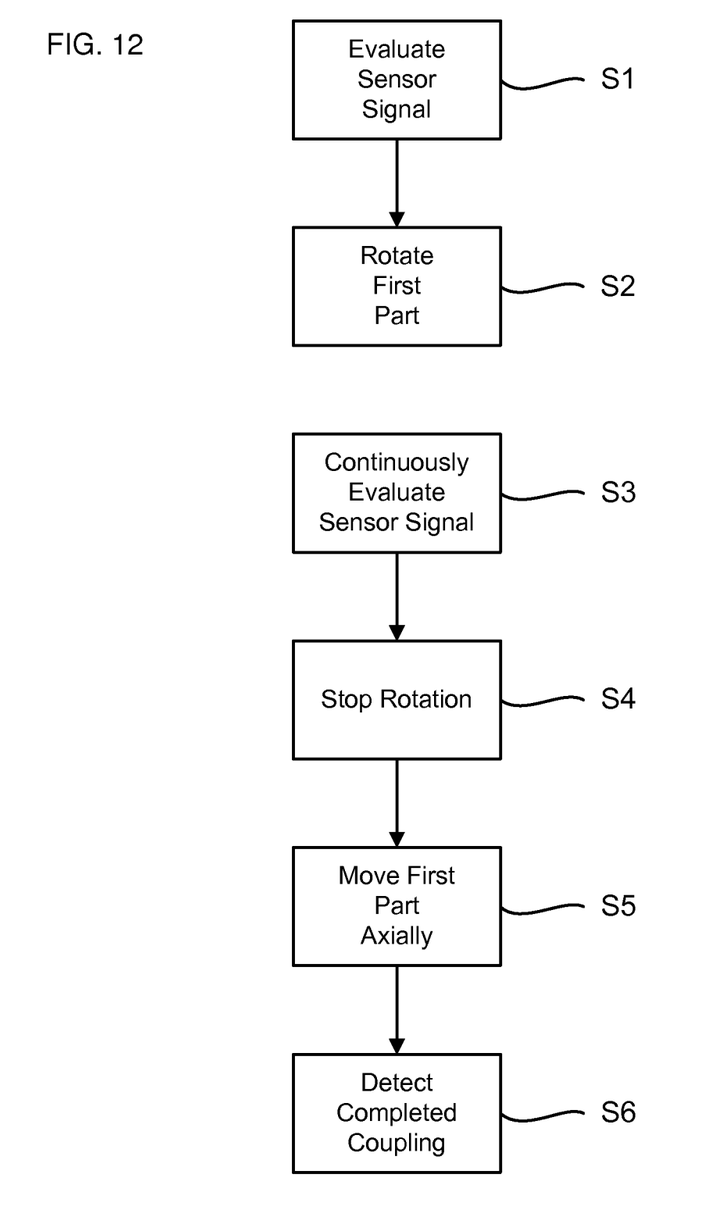
FIG. 12 shows a flow chart for illustrating method steps of a preferred embodiment of the method for determining a coupling state of two parts which can be coupled.

A preferred exemplary embodiment of the method according to the invention will now be described with reference to the flow chart in FIG. 12. In the process, reference will also be made to the schematic illustration of FIG. 10. In step S1, the sensor signal which is continuously output by the sensor 66 to the evaluation and control device 68 via the sensor line 67 is evaluated by the device 68 for the first time. The device 68 receives information about which received sensor signals correspond to which relative position of the parts 61, 62. For example, the sensor signal is only dependent on the magnetic field strength at the site of the magnetic-field-dependent resistance of the sensor 66. In this case, the greatest magnetic field strength prevails at the site of the sensor, for example in the case of the established coupling (FIG. 5). A lower magnetic field strength prevails in the case of FIG. 7, and a lower magnetic field strength than in the case of FIG. 5 likewise prevails in the case of FIG. 8. Secondly, a distinction can also be drawn between the different lateral positions from FIG. 7 and FIG. 8 by different magnetic field strengths and resulting different sensor signals from the sensor 66. For example, the magnetic field strength in the case of FIG. 8 is greater than in the case of FIG. 7. The assignment of the sensor signals to the possible relative positions is stored, for example, in the manner of a table in which the sensor signals are inserted in a first column and the associated relative positions are inserted in a second column in the table.

The sensor signal evaluated in step S1 means that the first part 61 and the second part 62 are in the decoupled state in which, however, coupling is possible solely by virtue of a movement in the axial direction. By way of example, the device 68 has received the instruction to move the first part 61 to a rotation position which is changed by two tooth periods, relative to the second part 62, and then to couple the parts 61, 62 to one another, by means of input means (not illustrated in FIG. 10). In step S2, the device 68 therefore actuates the first actuator 69 via the first control line 70 in such a way that said actuator effects a rotary movement of the first part 61. During the rotary movement, the device 68 continuously evaluates the sensor signals received by the sensor 66 (step S3). In this case, the device 68 initially establishes that the same sensor signal is again received by the sensor 66 after a rotary movement through one tooth period. As the rotary movement continues, the device 68 establishes, after a further rotation through a tooth period, that the same sensor signal as before the beginning of the rotary movement is again received by the sensor 66.

In the following step S4, the device 68 stops the rotary movement effected by the actuator 69 using a corresponding stop signal via the signal line 70. In the following step S5, the device 68 actuates an axial movement of the first part 61 via the second signal line 72, said axial movement being effected by the second actuator 71. As a result, the parts 61, 62 are coupled. The device 68 detects that the coupling has been established in step S6 by a sensor signal from the sensor 66 which corresponds to the established coupling being identified. The actuator 71 either stops the axial movement automatically on the basis of the mechanical resistance established by the coupling or, as an alternative, the device 68 stops the axial movement in a further step by virtue of a corresponding control signal which said device outputs to the second actuator 71 via the second signal line 72.

The coupling devices illustrated in the figures are merely examples which can be modified in other embodiments of the invention. In particular, the rotary joint illustrated in FIG. 2 and FIG. 3 can be changed in respect of the drives with which the parts which are to be coupled are moved. An electric motor is preferably used for the rotary movement of a part which is to be coupled. However, in contrast to the manner illustrated in FIG. 2 and FIG. 3, this electric motor can, for example, directly drive a shaft which is fixedly connected to the part which is to be rotated and the longitudinal axis of said shaft coincides with the rotation axis. However, other drives are also possible, for example drives with solenoids and optionally additionally elastically deformable parts, for example a coil spring.

By way of example, the solenoids can be dispensed with in the drive for the movement in the axial direction and instead one or more motors can be used, for example a linear motor or a conventional motor of which the drive torque is converted into a linear movement by means of a gear mechanism.

It is also possible to effect the axial movement pneumatically, for example by means of the pneumatically operated movement of a piston. As an alternative, a hydraulically operated axial movement is also possible. Furthermore, elastically deformable parts can also be used for the axial movement, for example springs which are prestressed in specific operating states and therefore can trigger a movement which is driven by the elastic parts. For example, the pneumatically or hydraulically driven parts can act against the elastic forces, so that the corresponding elastically deformable parts are prestressed and, after corresponding triggering, the countermovement can be effected, no drive force then being required by the pneumatic or hydraulic device for said counter-movement.

It is also possible to secure one of the coupling states, for example the coupled state, against a change in the state by prestressed elastically deformable parts. This secured state can then be changed, that is to say the corresponding part can be moved out of the state, by suitable drive forces (for example by an electric motor, a pneumatic device or a hydraulic device). For example, the coupled state is maintained by prestressed springs and the hydraulically operated piston can release one of the coupled parts from the other part by axial movement and thereby establish the decoupled state.

It is not necessary to follow the movement by evaluating the sensor signals over a period of time during the movement of the part, particularly if in each case one stop is provided for different coupling states (for example for a coupled state and a decoupled state), the moving part which is to be coupled butting against said stop when it is in the state. In this case, it is sufficient to establish, in each case by the sensor signal, that the part is in the state in which it butts against the stop. The same applies to the actuators illustrated in FIG. 10.

The invention claimed is:

1. A method of determining at least one of a coupled state or a decoupled state of a part to a machine, the method which comprises:
    determining a coupling state of the part to be coupled to the machine at a given contact region of the machine, wherein the part is movable in an axial direction in order to establish the coupled state, and movable away from the contact region in the axial direction in order to establish the decoupled state;
    generating with a magnetoresistive sensor a sensor signal being dependent on an axial position of the part relative to the contact region;
    evaluating the sensor signal to determine whether the part is coupled to the contact region of the machine or to determine whether the part is decoupled from the contact region;
    wherein the part to be coupled to the machine is a first part and the contact region is formed by a second part, and at least one of the first and second parts having a projection region projecting in the axial direction and engaging in a corresponding receptacle in the respective other part in the coupled state;
    wherein the first and second parts are rotatable relative to one another about the axial direction allowing the at least one projecting region to engage in a corresponding receptacle in the respective other part in one of a plurality of rotational positions, to thereby couple the first part to the second part in any of the plurality of rotational positions;
    generating with the magnetoresistive sensor a sensor signal being dependent on a relative rotational position of the first and second parts; and
    evaluating the sensor signal being dependent on the relative rotational position of the first and second parts to obtain information concerning the rotational position of the first part relative to the second part.

2. The method according to claim 1, wherein the machine is a coordinate measuring device or a machine tool machine.

3. The method according to claim 1, further comprising the step of evaluating the sensor signal being dependent on the relative rotational position of the first and second parts to determine whether the first part and the second part are oriented relative to one another in a predefined rotational position that allows the first part to be coupled to the second part by movement in the axial direction.

4. The method according to claim 1, which comprises repeatedly generating the sensor signals with the sensor during a relative movement of the first part and the contact region, and determining a current relative position of the first part and the contact region by evaluating a time profile of the sensor signals that are generated by the sensor.

5. A configuration for determining whether a part is coupled to or decoupled from a machine, the configuration comprising:
    a first part being the part to be coupled to the machine;
    a second part having a contact region of the machine for coupling said first part, said first part being movably disposed relative to said contact region in an axial direction in order to establish a coupled state, and to be moved away from said contact region in the axial direction in order to establish a decoupled state;
    a magnetoresistive sensor configured and positioned to generate a sensor signal that is dependent on an axial position of said first part;
    an evaluation device configured to receive the sensor signal from said magnetoresistive sensor and to evaluate the sensor signal and to use the evaluation to determine whether said first part is coupled to said contact region of the machine or said first part is spaced apart from said contact region;

one or both of said first and second parts having at least one projection region projecting in the axial direction and engaging in a corresponding receptacle in the respectively other of said first and second parts in the coupled state;

one of said first and second parts being rotatably supported relative to another one of said first and second parts about the axial direction and said at least one projecting region in each case engaging in a corresponding receptacle in the respective other part in a plurality of rotational positions, so that said first part can be coupled to said second part in any of the plurality of rotational positions; and said magnetoresistive sensor being configured and positioned to also generate a sensor signal that is dependent on a relative rotational position of said first and second parts; and said evaluation device being configured to receive and evaluate the sensor signal being dependent on the relative rotational position of the first and second parts and to obtain therefrom information about the rotational position of the first and second parts relative to one another.

6. The configuration according to claim 5, wherein the machine is a coordinate measuring device or a machine tool machine.

7. The configuration according to claim 5, which comprises a control device for controlling the axial movement of said first part, said control device being connected to, or integrated in, said evaluation device, and wherein the configuration is configured to couple said first part to said second part by axial movement when said evaluation device, by evaluating the generated sensor signal, has determined that said first part and said second part are disposed relative to one another in a predefined rotational position which allows said first part to be coupled to said second part by movement in the axial direction.

8. The configuration according to claim 5, which comprises a control device connected to said evaluation device, wherein said control device is configured to control a relative movement of said first and second parts, said evaluation device determines determination results by evaluating the sensor signal, and said control device controls the relative movement as a function of the determination results of said evaluation device.

* * * * *